United States Patent
Watanabe

(10) Patent No.: US 7,065,529 B1
(45) Date of Patent: Jun. 20, 2006

(54) WEB PAGE SEARCHING DEVICE FOR A PORTABLE TELEPHONE

(75) Inventor: Shigeo Watanabe, Nagoya (JP)

(73) Assignee: Wedge Co. Ltd., Aichi (JP)

( * ) Notice: Subject to any disclaimer, the term of this patent is extended or adjusted under 35 U.S.C. 154(b) by 464 days.

(21) Appl. No.: 10/296,316

(22) PCT Filed: Jun. 7, 2000

(86) PCT No.: PCT/JP00/03702

§ 371 (c)(1),
(2), (4) Date: Nov. 22, 2002

(87) PCT Pub. No.: WO01/90939

PCT Pub. Date: Nov. 29, 2001

(30) Foreign Application Priority Data

May 24, 2000 (JP) .............................. 2000-153653

(51) Int. Cl.
*G06F 17/30* (2006.01)
(52) U.S. Cl. .............................. 707/10; 707/3; 707/102
(58) Field of Classification Search .................... 707/3, 707/10, 102
See application file for complete search history.

(56) References Cited

U.S. PATENT DOCUMENTS

| | | | |
|---|---|---|---|
| 5,787,254 A * | 7/1998 | Maddalozzo et al. ....... | 709/228 |
| 6,243,596 B1 * | 6/2001 | Kikinis ........................ | 455/572 |
| 6,266,539 B1 * | 7/2001 | Pardo ....................... | 455/556.2 |
| 6,636,733 B1 * | 10/2003 | Helferich ................. | 455/412.2 |
| 6,650,889 B1 * | 11/2003 | Evans et al. ............. | 455/412.1 |
| 6,895,234 B1 * | 5/2005 | Laursen et al. ............. | 455/403 |
| 6,901,272 B1 * | 5/2005 | Isham ........................ | 455/566 |

* cited by examiner

*Primary Examiner*—Jeffrey Gaffin
*Assistant Examiner*—Haythim Alaubaidi
(74) *Attorney, Agent, or Firm*—Lowe Hauptman & Berner, LLP

(57) ABSTRACT

To provide a web page searching device for a portable telephone, the device to search data and transmit search results as a web page to the terminal device of a user wishing to acquire such data using the web display function in a portable telephone. A web page searching device for a portable telephone comprises at least a web server and a mail server for providing data via the Internet. The web page searching device further comprises a web publisher database for creating a web page and a web publication database. The web server comprises a function for transmitting web pages to user terminal devices, the web pages including a region part, a category search part, a keyword search part, the results of these searches, and a portable telephone display part replicating the web page to be displayed in a portable telephone; and a function for transmitting the search results as a web page to the portable telephone of the user.

8 Claims, 5 Drawing Sheets

WEB PAGE SEARCHING DEVICE FOR A PORTABLE TELEPHONE

TECHNICAL FIELD

The present invention relates to a web page searching device for a portable telephone that comprises a function to search data using a user terminal device, such as a personal computer, for a user wishing to acquire data with the web page display function of a portable telephone.

BACKGROUND ART

Conventional web page display functions of portable telephones use a search page dedicated to portable telephones having web page display functions in order to search various content provided on the web. However, because the display region in the screen of a portable telephone is limited, there has been a limitation on the method of rendering data in the display, the amount of data that can be acquired at one time, and the like. The method of displaying data also requires complex operations, thereby requiring much time and effort to display the data. Often the user cannot acquire the desired data.

In view of the foregoing, it is an object of the present invention to provide a web page searching device for a portable telephone comprising a function that allows a user wishing to acquire data using the web page display function of a portable telephone to search for data in a user terminal device having a large display area, such as a personal computer belonging to the user; a function for transmitting a web page including a display of the search results and a portable telephone display part imitating a web page displayed on an actual portable telephone; and a function for transmitting the search data as a web page to the portable telephone.

DISCLOSURE OF THE INVENTION

According to the present invention in claim 1, a web page searching device for a portable telephone employs a computer system that comprises at least a web server and a mail server for providing data via the Internet to users wishing to acquire data with portable telephones. The web page searching device comprises a web publisher database storing data for publications placed on web pages in the web server including at least region data identifying the publishing region, category data identifying the publication category, publication data identifying the publication contents, registrant data identifying the publisher registering the publication, and the e-mail address of the publisher; and a web publication database having at least region data identifying the publishing region, category data identifying the publication category, publication data identifying the publication contents, and the registration date of the publication. The web server comprises a function for transmitting web pages to the terminal devices of users wishing to acquire data, the web pages including at least a region part specifying the publishing region, a category search part for searching by a category of publication, a keyword search part for searching by keywords in the publication, the results of these searches, and a portable telephone display part replicating the web page to be displayed in a portable telephone; and a function for transmitting the search results as a web page to the portable telephone of the user wishing to acquire the data.

According to the present invention in claim 2, the mail server has a function for sending a web page address specified in the region part to the portable telephone via e-mail; and the web server has a function for transmitting a web page to the user terminal device, the web page having a function for transmitting the web page address via e-mail.

According to the present invention in claim 3, the web server comprises a function for transmitting a web page to the user terminal device, the web page having one or more address books capable of recording web page addresses for a portable telephone that are obtained in searches.

According to the present invention in claim 4, the web page addresses are stored in the address book using a cookie function capable of saving and reading prescribed data obtained by a web browser in the user terminal device that displays the web page.

According to the present invention in claim 5, the mail server has a function for sending a web page address in the address book to the portable telephone via e-mail; and the web server has a function for transmitting a web page to the user terminal device, the web page having a function for transmitting the web page address via e-mail.

According to the present invention in claim 6, the web server comprises a function for registering the web page of a web page owner that can be displayed on the portable telephone; and a function for recording data about the owner in both the web publisher database and the web publication database and for transmitting a web page for registering the web page of this owner to the user terminal device.

According to the present invention in claim 7, the web server comprises a function for creating a web page for a data provider wishing to publish data capable of being displayed on the portable telephone; and a function for recording data about the data provider wishing to publish data in both the web publisher database and the web publication database and for transmitting a web page for registering the web page of this data provider to the user terminal device.

According to the present invention in claim 8 the web publication database stores data describing the period of publication; and the web server has a function for recording this publication period data in the web publication database and for transmitting a web page belonging to the data provider to the user terminal device during this publication period.

BEST MODE FOR CARRYING OUT THE INVENTION

A web page searching device for a portable telephone according to a preferred embodiment of the present invention will be described while referring to the accompanying drawings.

Figure 1:
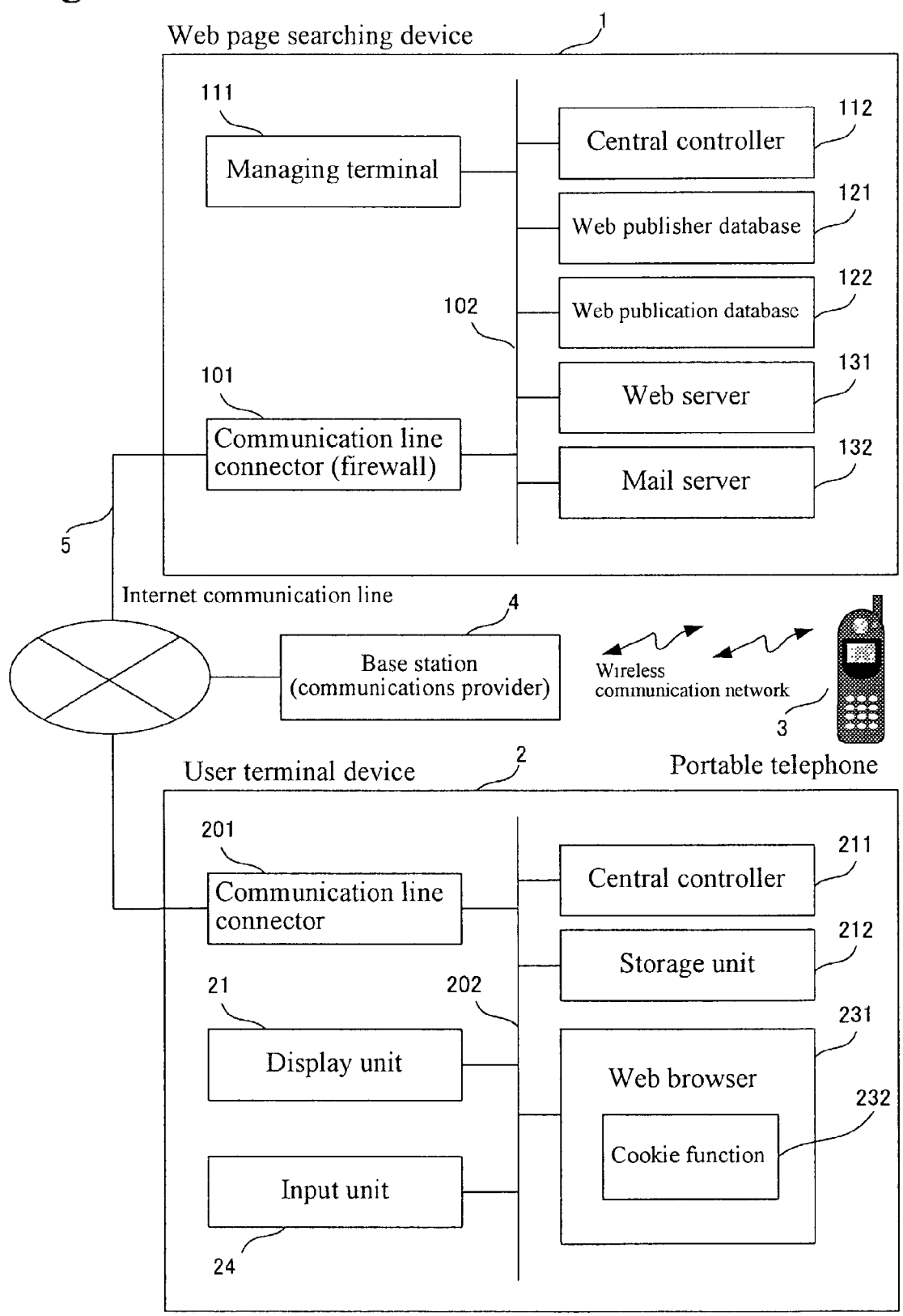
FIG. 1 is a block diagram showing the construction of a web page searching device for a portable telephone according to a preferred embodiment of the present invention.

FIG. 1 shows the general construction of a web page searching device for a portable telephone according to a preferred embodiment of the present invention.

A web page searching device for a portable telephone 1 comprises a managing terminal 111, a central controller 112 for controlling the web page searching device 1, a web publisher database 121 for storing data related to the publisher, a web publication database 122 for storing contents of the publication, a web server 131 for transmitting and replying to web pages, a mail server 132 for accumulating and distributing electronic mail, and a communication line connector (firewall) 101 for connecting the web page searching device 1 to an Internet communication line 5. These components are connected to one another via a system bus 102.

The communication line connector (firewall) 101 serves to safely connect the web server 131 or the mail server 132 to the external Internet communication line 5.

A portable telephone 3 includes a function for transmitting and receiving e-mail and a function for displaying web pages. The portable telephone 3 is connected to the Internet communication line 5 via a wireless communication network and a base station (communications provider) 4. A personal computer, such as a desktop or notebook type computer, is envisioned as the user terminal device 2, wherein the computer comprises a screen display region larger than the display region of the screen in the portable telephone 3. The user terminal device 2 comprises a central controller 211 for controlling the user terminal device 2, a storage unit 212 such as a RAM, ROM, or hard disk, and a web browser 231 for interpreting and displaying web pages transmitted from the web page searching device 1. The web browser 231 also has a cookie function 232 capable of saving and reading prescribed values that are acquired.

The user terminal device 2 further comprises a display unit 21 for displaying web pages and the like, and an input unit 24 such as a mouse or other pointing device, a keyboard, and the like for inputting data in response to the web pages or the like.

Figure 2:
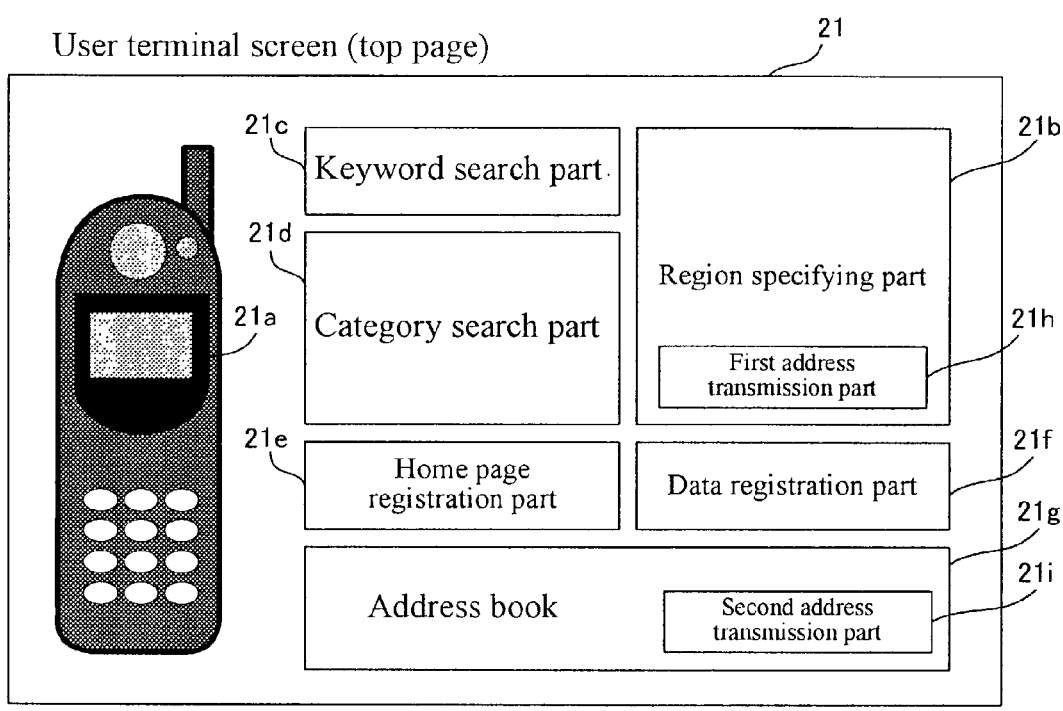
FIG. 2 is a block diagram showing the display screen (top page) of the user terminal device in the web page searching device for a portable telephone of the preferred embodiment.
Figure 3:
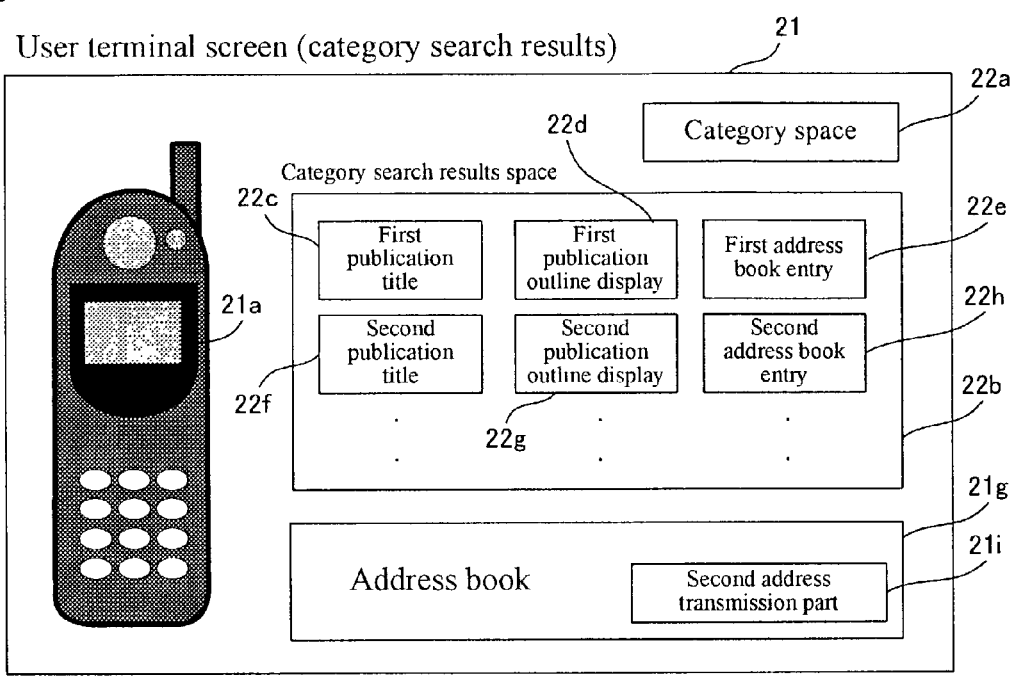
FIG. 3 is a block diagram showing the display screen (category search results) of the user terminal device in the web page searching device for a portable telephone of the preferred embodiment.
Figure 4:
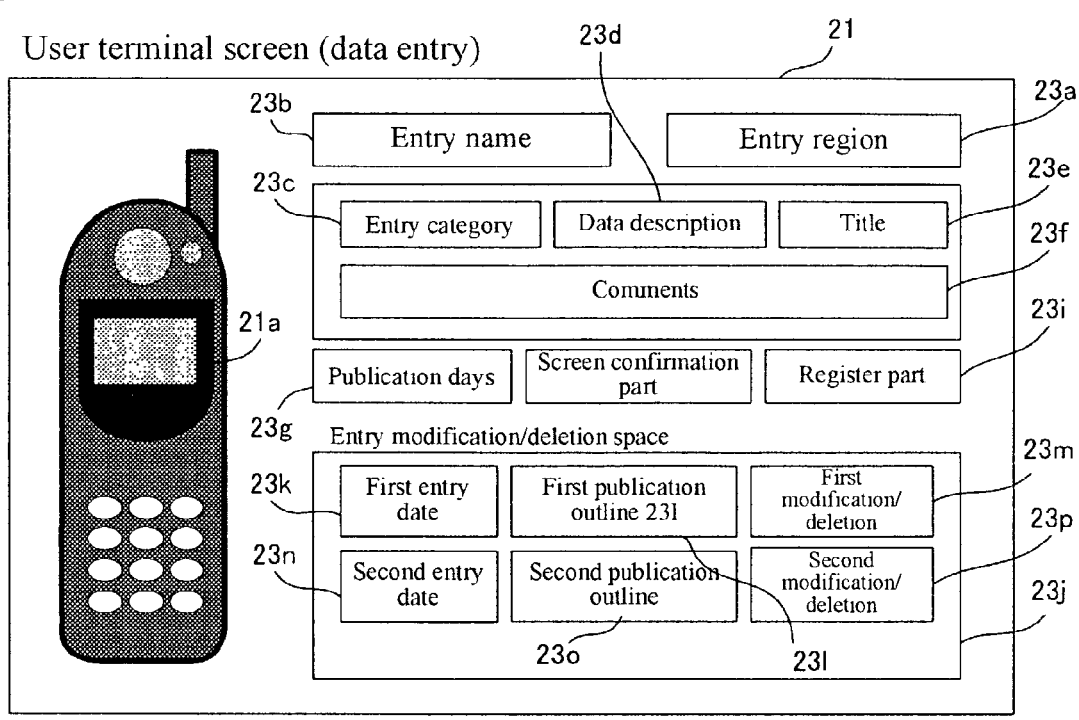
FIG. 4 is a block diagram showing the display screen (data entry) of the user terminal device in the web page searching device for a portable telephone of the preferred embodiment.

FIGS. 2–4 show the general configuration of a display screen in the user terminal device 2 used with the web page searching device for a portable telephone of the preferred embodiment when displaying a web page transmitted from the web page searching device 1 of FIG. 1. The web server 131 of the web page searching device 1 responds to input from the user terminal device 2, searching the web publisher database 121 and web publication database 122 or recording data in the those databases when necessary.

The user terminal screen 21 displayed in the display unit in the user terminal device 2, as shown in FIG. 2, comprises a portable telephone display part having a portable telephone display screen 21a replicating the web page displayed in the actual portable telephone 3; a region specifying part 21b for specifying a region of published data; a keyword search part 21c for searching publications using keywords; a category search part 21d for searching publications by category; a one page registration part 21e for registering a web page belonging to the user that owns the web page displayed in the portable telephone; a data registration part 21f for stores and the like wishing to publish data; and an address book 21g for recording the addresses of web pages obtained during searches.

The region specifying part 21b includes a first address transmission part 21h functioning to transmit the address for a web page displaying data in a specified region to a specified portable telephone via e-mail. Similar to the region specifying part 21b, the address book 21g includes a second address transmission part 21i functioning to transmit an address recorded in a specified portable telephone via e-mail.

The ome page registration part 21e uses a menu (not shown) to enable the owner of a web page for a portable telephone to register that web page in order to publish data, by inputting the title of the owner's web page, the URL (web page address), a description of the web page, a publication category, keywords, and the like.

After operating the input unit 24 using a mouse or other pointing device, a keyboard, or the like, the inputted parts shown on the display screen are interpreted by the web browser 231, and the display screen is changed when necessary. Data or commands obtained through operations of the input unit 24 are transmitted to the web page searching device 1 when necessary. The web server 131 transmits or sends a new web page to the user terminal device 2 in response to such commands.

The user terminal screen (category search results) 21 shown in FIG. 3 is configured to display results obtained by the category search part 21d in FIG. 2. The searched category is displayed in a category space 22a. Data obtained by the category search is displayed in a category search results space 22b. A web page for this data is displayed in the portable telephone display screen 21a at a size similar to the actual display screen in the portable telephone 3. By specifying the address of this web page, it is possible to display the web page in the actual portable telephone 3, as well.

The category search results space 22b comprises a first publication title 22c, a first publication outline display 22d, and a first address book entry 22e. When search data exists, the category search results space 22b further displays a second publication title 22f, a second publication outline display 22g, and a second address book entry 22h. By manipulating the publication titles with the input unit 24, a confirmation screen for the corresponding web page is displayed in the portable telephone display screen 21a. By manipulating the first address book entry 22e or second address book entry 22h in the category search results space 22b with the input unit 24, the address for the corresponding web page is recorded in the address book 21g. By specifying the e-mail address of a portable telephone in the second address transmission part 21i, it is possible to transmit one or more web addresses recorded in the address book 21g to this portable telephone via e-mail. The web pages can be displayed in the portable telephone display screen 21a by operating the titles of the web pages displayed in the address book 21g using the input unit 24. Web addresses in the address book are saved in the storage unit 212 using the cookie function 232 and read from the storage unit 212 with the cookie function 232 when necessary.

The user terminal screen (data entry) 21 shown in FIG. 4 is obtained by operating the data registration part 21f in FIG. 2 using the input unit 24. By inputting an ID and password, a registered web publisher can register data for a store or the like wishing to publish data and can transmit registered web pages.

Although not shown in the drawings, an input screen for a registration form is sent in the form of a web page from the web page searching device 1 in FIG. 1. A person wishing to publish data inputs a registration name, store name, address, telephone number, registrant identifying data such as a desired password or the like, an e-mail address for the registrant, publication region identifying data for identifying the region of the data to be published, publication category data indicating a desired category for the publication, publication identifying data identifying the publication contents, and the like and transmits this data to the web page searching device 1. The web server 131 enters the data sent from the user terminal device 2 in the web publisher database 121 and uses the data when configuring the web page.

The user terminal screen (data entry) 21 comprises an entry region 23a, entry name 23b, entry category 23c, data description 23d, web page title 23e, comments 23f indicating an outline of the data or the like, and number of publication days 23g indicating the period for publishing registered data and web pages.

By manipulating a screen confirmation part 23h with the input unit 24, the created web page can be viewed in the portable telephone display screen 21a. By operating the register part 23i with the input unit 24, data inputted in the entry region 23a, entry name 23b, entry category 23c, data description 23d, web page title 23e, and comments 23f is actually recorded and can be transmitted as a web page and displayed in an entry modification/deletion space 23j.

The entry modification/deletion space 23j comprises a first entry date 23k, a first publication outline 231, and a first modification/deletion 23m. Adding further entries will display a second entry date 23n, a second publication outline 23o, and a second modification/deletion 23p. Data can be modified or deleted by manipulating the corresponding first modification/deletion 23m or second modification/deletion 23p with the input unit 24. Web pages can be viewed in the portable telephone display screen 21a by manipulating the corresponding first publication outline 231 or second publication outline 23o with the input unit 24.

Figure 5:
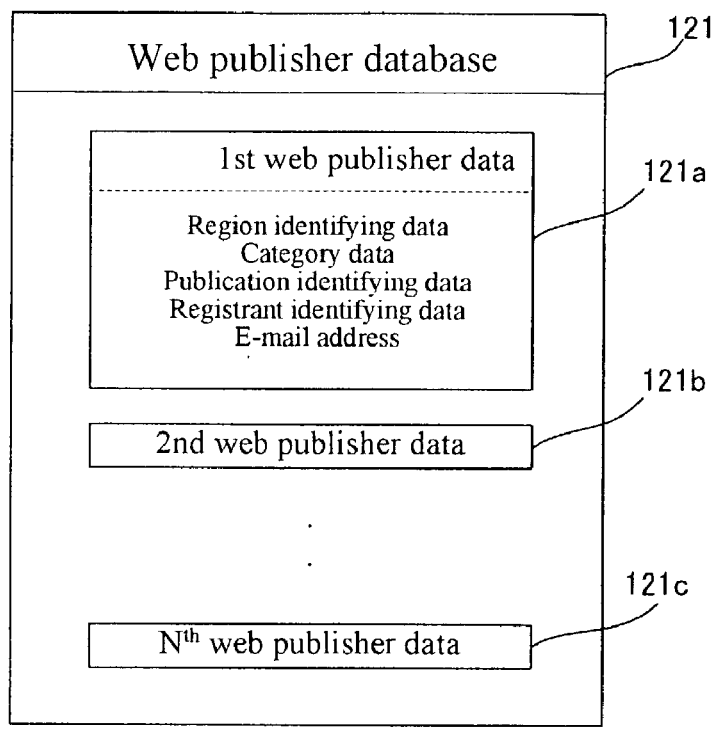
FIG. 5 is a block diagram showing the contents of the databases in the web page searching device for a portable telephone of the preferred embodiment.
Figure 5:
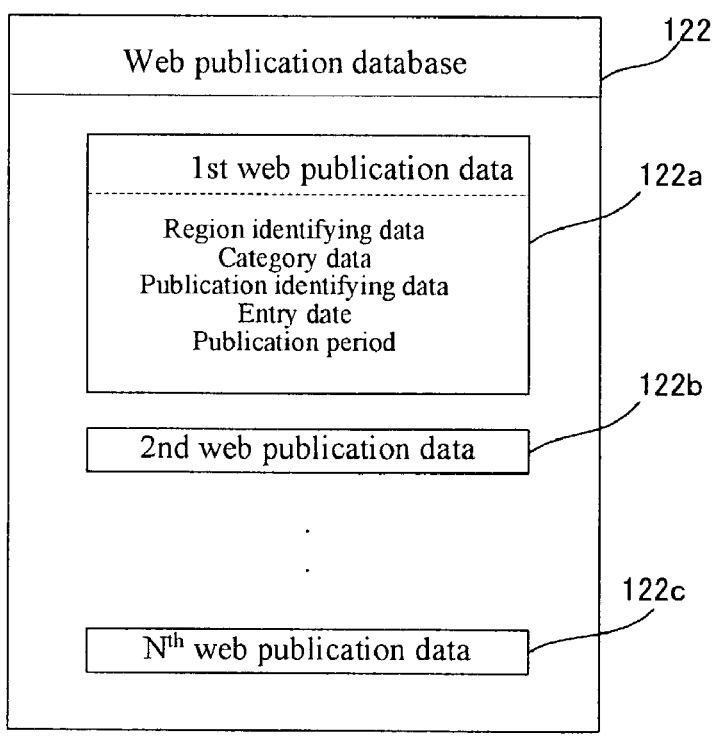

FIG. 5 shows the general contents of a database used in the web page searching device for a portable telephone of the preferred embodiment.

$1^{st}$–$n^{th}$ web publisher data 121a–121c in the web publisher database 121 is obtained from entries of people wishing to publish data, as indicated in the description of FIG. 4. Each publisher data comprises region identifying data identifying the region of data to be published, category data indicating the desired category of the published data, publication identifying data for identifying the publication contents, registrant identifying data for identifying the registrant of the published data, and the e-mail address of the registrant.

$1^{st}$–$n^{th}$ web publication data 122a–122c is obtained as indicated in the description of FIG. 2 or FIG. 4 when the owner of a web page or a user, such as a store wishing to publish data, inputs data according to the operation procedure in the web page transmitted from the web page searching device 1. The $1^{st}$–$n^{th}$ web publication data 122a–122c each comprise region identifying data for identifying the region of data to be published; category data for indicating the desired category of the published data; publication identifying data for identifying the publication data, including its title, comments, and the like; the entry date of the published data, and the publication period for the data.

In the preferred embodiment, the web publisher database and web publication database are used for data search screens, search results, data input, and the like. However, the data configuration can be optimized when necessary to account for search speed, contents of the published data, and the like.

INDUSTRIAL APPLICABILITY

The invention in claim 1 can provide a function for selecting data based on a particular region, a function for searching data by keyword, and a function for searching by category to users wishing to obtain data in a web page on a portable telephone. By transmitting the results of these searches in a web page with a portable telephone display part replicating the web page displayed in an actual portable telephone to a user terminal invention, it is possible to confirm the display for the portable telephone and transmit a web page of the search results to the portable telephone.

The invention of claim 2 can transmit an address specifying a region at which data is desired to a portable telephone via e-mail. Accordingly, a web page for this region can easily be displayed using the linking function of the portable telephone.

The present invention of claims 3 and 4 can record multiple addresses for data acquired in a search and save the addresses in a user terminal device.

The present invention of claim 5 can transmit addresses for data acquired in a search to a portable telephone via e-mail. Accordingly, a web page for this data can easily be displayed using the linking function of the portable telephone.

The present invention of claim 6 can record web pages belonging to the owner of a portable telephone web page. The web pages can be provided as publication data and transmitted to portable telephones.

The present invention of claim 7 can create web pages with data for data providers, such as stores and the like, wishing to provide data. The web pages can be provided as publication data and transmitted to portable telephones.

The present invention of claim 8 can establish an effective period for publishing data and transmitting web pages by recording a publishing period.

What is claimed is:

1. A web page searching device for a portable telephone employing a computer system that comprises at least a web server and a mail server for providing data via the Internet for searching the data using a user's terminal having a screen larger than a display area of the portable telephone to users wishing to acquire data with a web display function of portable telephones, the web page searching device comprising:

a web publisher database storing data for publications placed on web pages transmitted to said user's terminal and said portable telephone by the web server including at least region data identifying the publishing region, category data identifying the publication category, publication data identifying the publication contents, registrant data identifying the publisher registering the publication, and the e-mail address of the publisher; and a web publication database having at least region data identifying the publishing region, category data identifying the publication category, publication data identifying the publication contents, and the registration date of the publication;

wherein the web server comprises:

a function for transmitting web pages to the user's terminal devices, the web pages including at least a region part specifying the publishing region, a category search part for searching by a category of publication, a keyword search part for searching by keywords in the publication, the results of these searches, a portable telephone display part replicating the web page to be transmitted and displayed in a portable telephone, and an e-mail address specifying part for sending e-mails publishing addresses of the web pages for displaying the region data specified by the region specifying part; and a function for transmitting, to said portable telephone, web pages with a same constitution as that of the web pages displayed on said portable telephone display part replicating the web pages of said user's terminal device based on the search results.

2. A web page searching device for a portable telephone as recited in claim 1, wherein the mail server has a function for sending e-mails publishing a web page address displaying the region data specified in the region part to the portable telephone specified by said e-mail address specifying part.

3. A web page searching device for a portable telephone as recited in claim 1, wherein the web server has a function for transmitting a web page to the user terminal device, the web page including one or more address books capable of recording web page addresses for a portable telephone that are obtained in searches.

4. A web page searching device for a portable telephone as recited in claim 3, wherein the web page addresses are stored in the address book using a cookie function capable of saving and reading prescribed data obtained by a web browser in the user terminal device that displays the web page.

5. A web page searching device for a portable telephone as recited in claim 3, wherein the web server has a function for transmitting, to said user's terminal, a web page with an e-mail address part to send e-mails publishing the web page addresses registered with the address book to the portable telephone; and the mail server has a function for sending the e-mails publishing a web page address registered with in the address book to the portable telephone specified by the e-mail address part.

6. A web page searching device for a portable telephone as recited in claim 1, wherein the web server has a function for registering the web page of a web page owner that can be displayed on the portable telephone; and a function for recording data about the owner in both the web publisher database and the web publication database and for transmitting a web page for registering the web page of said owner to the user terminal device.

7. A web page searching device for a portable telephone as recited in claim 1, wherein the web server has a function for creating a web page for a data provider wishing to publish data capable of being displayed on the portable telephone; and a function for recording data about the data provider wishing to publish data in both the web publisher database and the web publication database and for transmitting a web page for registering the web page of said data provider to the user terminal device.

8. A web page searching device for a portable telephone as recited in claim 1, wherein the web publication database stores data describing the period of publication; and the web server has a function for recording this publication period data in the web publication database and for transmitting a web page belonging to the data provider to the user terminal device during this publication period.

* * * * *